US008777000B2

(12) United States Patent
Krämer et al.

(10) Patent No.: US 8,777,000 B2
(45) Date of Patent: Jul. 15, 2014

(54) CENTERING ELEMENT FOR CONTAINER HOLDERS ON CONTAINER PROCESSING MACHINES, CONTAINER HOLDER, AND CONTAINER PROCESSING MACHINES COMPRISING SUCH CONTAINER HOLDERS

(75) Inventors: Klaus Krämer, Dortmund (DE); Lutz Deckert, Haltern am See (DE)

(73) Assignee: KHS GmbH, Dortmund (DE)

( * ) Notice: Subject to any disclaimer, the term of this patent is extended or adjusted under 35 U.S.C. 154(b) by 265 days.

(21) Appl. No.: 13/254,882

(22) PCT Filed: Mar. 25, 2010

(86) PCT No.: PCT/EP2010/001872
§ 371 (c)(1), (2), (4) Date: Sep. 6, 2011

(87) PCT Pub. No.: WO2010/115521
PCT Pub. Date: Oct. 14, 2010

(65) Prior Publication Data
US 2011/0315522 A1 Dec. 29, 2011

(30) Foreign Application Priority Data
Apr. 6, 2009 (DE) ........................ 10 2009 016 321

(51) Int. Cl.
*B65G 47/84* (2006.01)

(52) U.S. Cl.
USPC ............ 198/867.11; 198/867.12; 198/803.14; 198/803.15

(58) Field of Classification Search
USPC .............. 198/803.14, 803.15, 867.11, 867.12
See application file for complete search history.

(56) References Cited

U.S. PATENT DOCUMENTS

| | | | | |
|---|---|---|---|---|
| 3,527,334 | A | 9/1970 | Wideman | |
| 4,799,846 | A * | 1/1989 | Wissman et al. | 413/66 |
| 4,807,421 | A * | 2/1989 | Araki et al. | 53/167 |
| 5,215,180 | A * | 6/1993 | Allard et al. | 198/395 |
| 5,813,513 | A * | 9/1998 | Taube | 198/803.14 |
| 6,405,853 | B1 * | 6/2002 | Cook et al. | 198/803.8 |
| 6,508,498 | B1 * | 1/2003 | Spether | 294/116 |
| 6,832,640 | B2 | 12/2004 | Caprara et al. | |
| 7,278,536 | B1 * | 10/2007 | Harrison et al. | 198/867.09 |
| 7,473,092 | B2 * | 1/2009 | Pan | 425/534 |
| 7,673,435 | B2 * | 3/2010 | Thielmann | 53/167 |
| 7,980,380 | B2 * | 7/2011 | Thielmann | 198/377.01 |
| 8,011,166 | B2 * | 9/2011 | Sheets et al. | 53/127 |

FOREIGN PATENT DOCUMENTS

| | | |
|---|---|---|
| DE | 1218930 | 6/1966 |
| DE | 1761059 | 4/1971 |
| DE | 6607750 | 4/1971 |
| DE | 3132772 | 3/1983 |
| DE | 3922075 | 1/1991 |
| DE | 4128733 | 3/1993 |
| DE | 19806335 | 8/1999 |
| DE | 20114062 | 2/2002 |
| DE | 60312378 | 11/2007 |
| EP | 1251074 | 10/2002 |
| EP | 1572569 | 9/2005 |
| EP | 1657162 | 5/2006 |
| WO | 93/04960 | 3/1993 |
| WO | 00/56608 | 9/2000 |

* cited by examiner

*Primary Examiner* — Douglas Hess
(74) *Attorney, Agent, or Firm* — Occhiuti & Rohlicek LLP

(57) ABSTRACT

Disclosed is a centering element for use with container holders or turntables on container processing machines, comprising a centering cone that has a cone-type or taper-type centering surface for receiving and centering each container on the bottom of the container.

20 Claims, 5 Drawing Sheets

Figure 1:
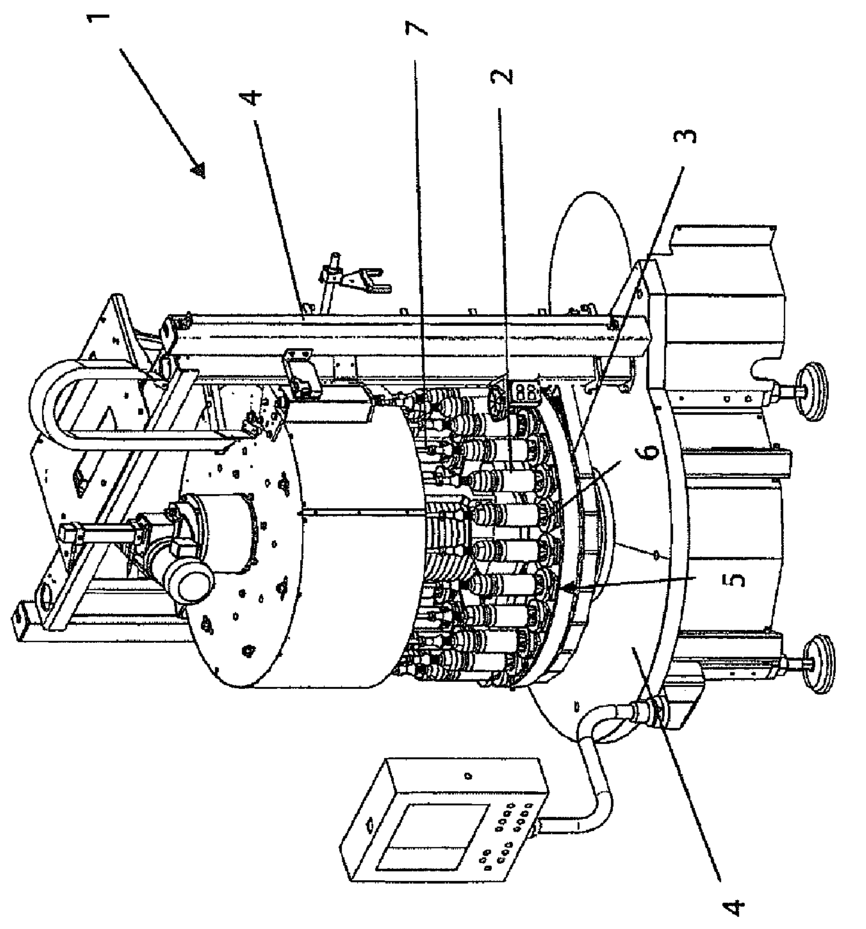

Fig. 7
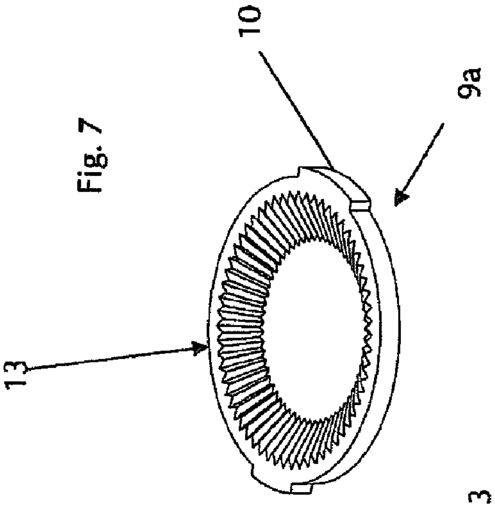
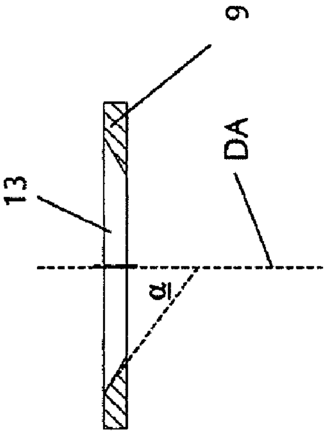
Fig. 5
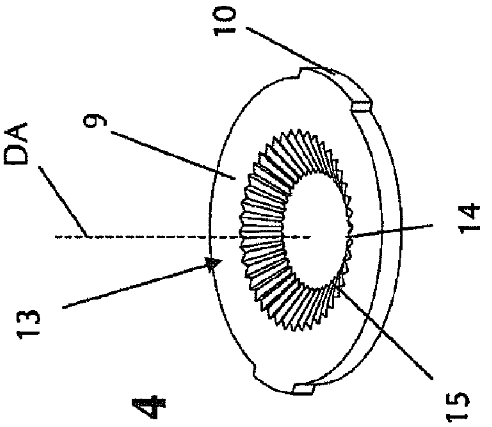
Fig. 4

CENTERING ELEMENT FOR CONTAINER HOLDERS ON CONTAINER PROCESSING MACHINES, CONTAINER HOLDER, AND CONTAINER PROCESSING MACHINES COMPRISING SUCH CONTAINER HOLDERS

CROSS-REFERENCE TO RELATED APPLICATIONS

This application is the National Stage of International Application No. PCT/EP2010/001872, filed on Mar. 25, 2010, which claims the benefit of the priority date of German Patent Application No. 10 2009 016 321.2, filed on Apr. 6, 2009. The contents of both applications are hereby incorporated by reference in their entirety.

The invention relates to a centering element according to preamble 1, to a container holder or turntable according to patent claim 8 and to a container processing machine according to the preamble of patent claim 12.

Container processing machines for the processing of bottles or other containers, particularly for the labelling, inspection, printing etc. of containers, are known in different versions. Generally, such machines usually consist of a rotatingly drivable transport element, preferably in the form of a rotor rotatingly drivable around a vertical machine axis, on which a plurality of processing positions are provided, each of which serves to receive one container at a time and, with a rotatingly driven transport element, moves the container concerned past, for example, at least one processing station. The containers are arranged upright at the processing positions, e.g. such that they each stand up with a bottom area on a container holder implemented as a turntable. For optimum processing of the containers, particularly during labelling, printing or inspection, but also for other types of processing, exact centering of the respective container is required in relation to a container holder axis around which the container, during processing, is turned or swivelled with the container holder, in a controlled manner. To achieve the centering of the containers by their container bottoms standing on the container holder, it is normal to interchangeably provide centering plates or centering rings on the container holders, each of which are provided with a tapered or cone-shaped centering opening forming a centering cone.

To achieve slip-free turning or swivelling of the respective centred container with the container holder, it is also normal to implement the container holder at the bottom of the centering opening with a friction lining with the aim that the container centred in the centering opening also rests, with its container bottom, against the friction lining and thus that the container is not only centered but, for transmitting the driving forces or drive torques necessary for its turning or swivelling through force-lock or friction-lock, is also connected with the container holder.

A disadvantage of this is that even small deviations of the container diameter from a setpoint in the area of the container bottom lead to such a container resting against the centering surface with its bottom area but not or only insufficiently against the friction lining at the bottom of the centering opening. When swivelling or turning the container holder around its container holder axis, the driving forces or drive torques for turning or swivelling the container along are not or only insufficiently transmitted to it, so that the turning or swivelling of the container necessary for processing is not ensured. To avoid this disadvantage, according to prior art, superior containers with low tolerances of the container diameter are necessary which, particularly due to the higher cost of such containers, is disadvantageous. Furthermore, a separate set of centering rings is required for each container grade. During changeover of the container processing machine from one container grade to another, all centering rings are exchanged which means a lot of work.

The task of the invention is to show a centering element which avoids the above-mentioned disadvantages and, even for greater deviations of the container diameter in the bottom area, ensures proper centering and transmission of the driving forces or drive torques from the container holder to the respective container. To solve this task, a centering element is implemented pursuant to patent claim 1. A container holder and a container processing machine are the subject of patent claims 8 and 12.

An essential feature of the invention is that the centering surface or conical surface of the centering cone or of the centering element, simultaneously, is also designed for effective transmission of the driving forces or drive torques from the container holder to the container.

Further embodiments, advantages and potential applications of the invention also arise from the following description of exemplary embodiments and from the figures, with all features described and/or depicted separately or in any combination fundamentally being the subject of the invention, irrespective of their summary in the claims or their relation. Moreover, the content of the claims is made a part of the description.

Figure 3:
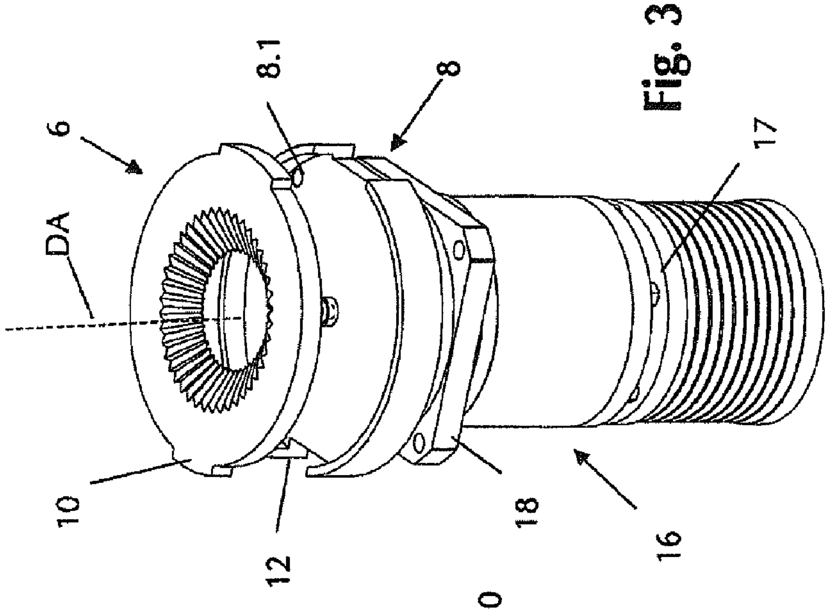
Figure 2:
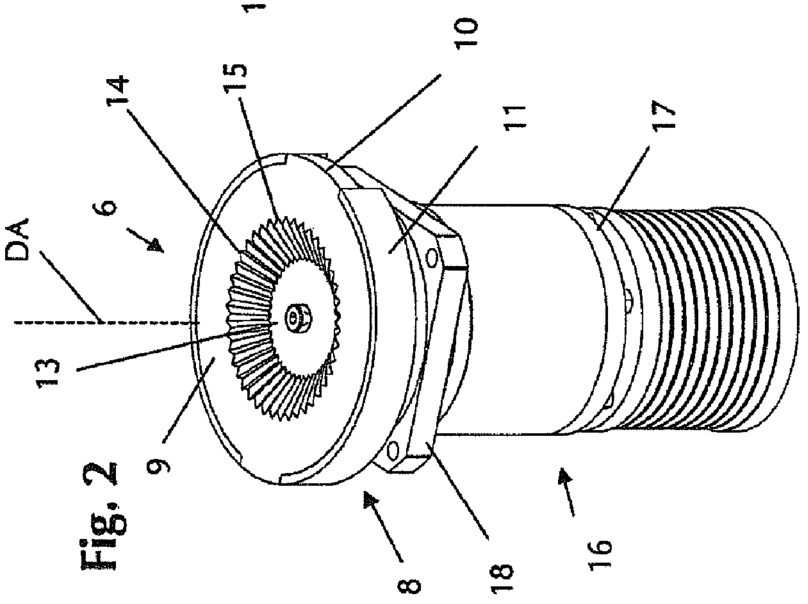
Figure 6:
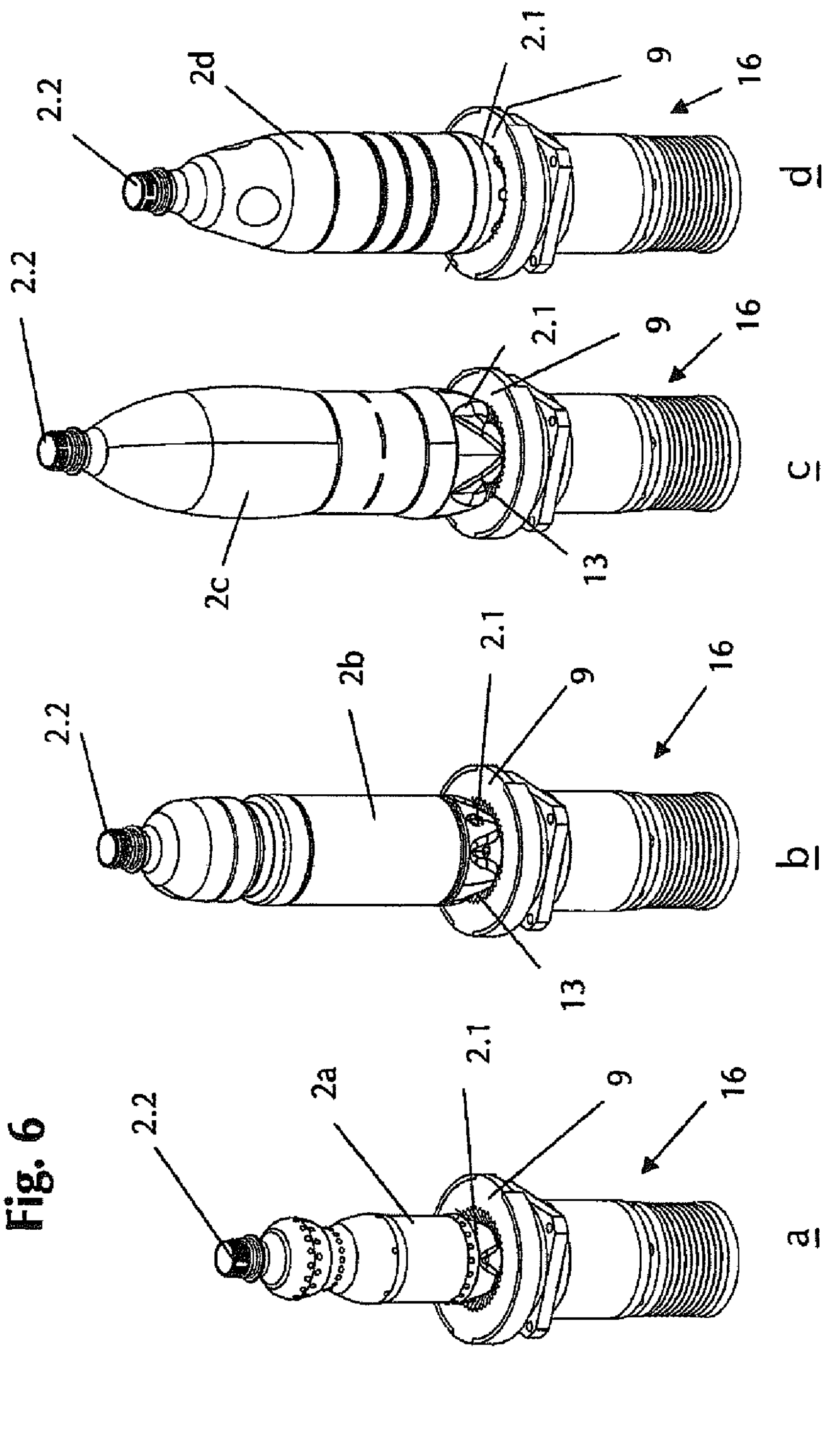
Figure 8:
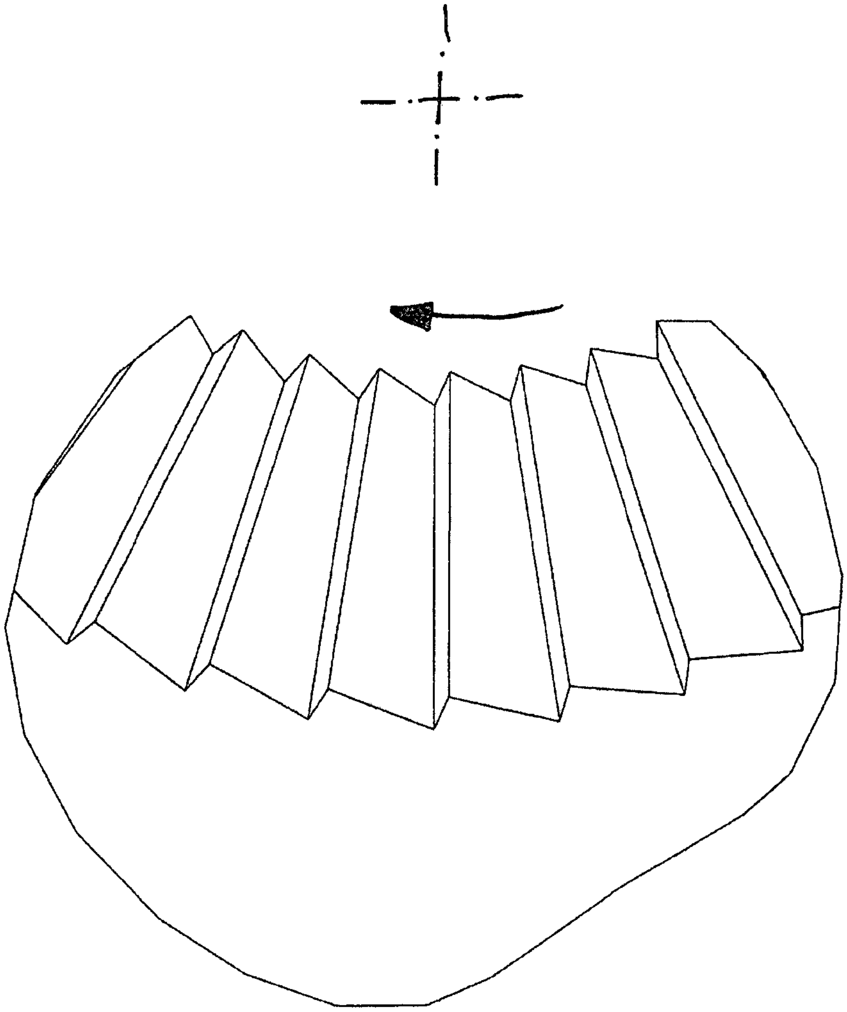

The invention is clarified below using the figures and exemplary embodiments, showing:

FIG. 1 in perspective view, a container- or bottle-processing machine in the form of a labelling machine;

FIG. 2 in single illustrations, a turntable unit of the processing machine of FIG. 1 with a centering element in the form of a centering plate, i.e. with a centering plate arranged on a driving turntable;

FIG. 3 the turntable unit with the centering plate raised by the driving turntable;

FIG. 4 the centering plate in perspective single illustration;

FIG. 5 the centering plate of FIG. 4 in sectional view;

FIG. 6 in positions a-d, the turntable unit together with the containers or bottles of different sizes arranged on the centering plate of this unit;

FIG. 7 in perspective single illustration, a centering plate with an enlarged centering opening;

FIG. 8 in perspective view (heavily magnified single illustration), a centering plate with a preferred direction of rotation.

The container processing machine generally identified as 1 in the figures for example serves to label containers in the form of bottles 2 which, in the figures, are represented as PET bottles but can also be other containers or bottles. The container processing machine 1 for example consists of a rotor 3 rotatingly drivable around a vertical machine axis MA pivoted at a machine frame 4 and, at the periphery of which, at equal angular distances distributed around the machine axis MA, processing positions 5 are provided at which the bottles 2 to be processed or to be labelled and arranged standing, with rotor 3 rotating, are moved past processing stations not shown which are the labelling units, label brush-on elements or label press-on elements. Via a container infeed not shown, the bottles 2 to be processed are individually fed to a processing position 5. The processed bottles 2 are again removed at a container outfeed, not shown, from the processing positions 5.

Each processing position 5 includes a container holder in the form of a turntable 6 forming a standing surface for the respective bottle 2 which can be rotated or swivelled, in a controlled manner, around a turntable axis DA in parallel orientation with the machine axis MA, as well as a stamp 7 arranged above the turntable 6 on the same axis as the turntable axis DA. It can be moved up and down, controlled within its axis, to clamp the respective bottle 2 directly during handover to the processing position 5 between the turntable 6, on which the bottle 2 stands with its bottom 2.1, and the lowered stamp 7 resting against the closed bottle mouth 2.2 and to secure it against falling over or to release the processed bottle 2 immediately during removal from the processing position 5.

Each turntable 6, in the embodiment shown, has two parts consisting of a driving turntable 8 and a flat standing plate or centering plate 9 removably or interchangeably fixed to the top of the driving turntable 8. In the embodiment shown the centering plate 9 is, at its circumference, disk-shaped and implemented with two projections 10 offset 180° to one another and matchingly inserted into the driving turntable 8 having a tray-like top, such that the centering plate 9, at its circumferential sections between the projections 10, is always enclosed by one table edge section 11 of the driving turntable 8 and the two projections 10 engage into recesses 12 formed between the table edge sections 11. This achieves a positive-fit connection between the driving turntable 8 and the respective centering plate 9 for turning or swivelling around the turntable axis DA. The centering plate 9, which rests with its centering plate bottom against the driving turntable 8, for example is secured by at least one permanent magnet 8.1 provided at the driving turntable 8. For this the centering plate 9 is, at least in its area which interacts with the permanent magnet 8.1, of ferromagnetic design. The table edge sections 11 are designed such that they do not project beyond the top of the mounted centering plate 9 facing away from the driving turntable 8.

Each centering plate 9 has a central centering opening 13 which, in its mounted state, is arranged on the same axis as the turntable axis DA and, tapered or cone-shaped, features a diameter which reduces from the centering plate top to the centering plate bottom. At its edge or at the tapered or centering surface, the centering opening 13 is profiled, in the embodiment represented, with a plurality of tooth-like or rib-like projections 14 and in-between indentations 15 each of which are provided distributed at uniform angular distances around the axis of the centering opening 13 and thus around the turntable axis DA and each of which extend from the centering plate top to the centering plate bottom, that is each along a surface line of the tapered centering opening 13. In the embodiment represented, the profiling formed by the projections 14 and the indentations 15 is shaped such that each projection 14 in the sectional view has two flat or essentially flat flanks leading to an indentation 15 which, at the top of the projection 14, merge into one another and, there, form an exposed ridge extending along the surface line of the centering opening 13. In the embodiment represented, the centering opening 13 of each centering plate 9 is shaped such that half the taper angle of the centering opening 13, i.e. the angle $\alpha$ enclosed by the ridge of a projection 14 with the turntable axis DA, is about 50 to 60°.

Each turntable 6 is part of a turntable unit 16 which includes a drive 17, for example in the form of an electromotoric actuator at whose output shaft the driving turntable 8 for a controlled turning or swivelling motion around the turntable axis DA is affixed. With a mounting flange 18, each turntable unit 16 is provided interchangeably at the rotor 3.

The particular feature the processing machine 1 or of the turntable 6 of this machine is the implementation of the centering openings 13 described above with the profiling formed by the projections 14 and the indentations 15.

This implementation first ensures that every bottle 2 handed over at a processing position 5, which then is received with its bottle bottom 2.1 in the centering opening 13 of the turntable 6 concerned or the associated centering plate 9, when lowering and pressing the stamp 7 against the closed bottle mouth 2.2, is also centred at its bottle bottom 2.1 in respect of the turntable axis DA.

Additionally, through the projections 14, an effective force-locked or friction-locked connection between the turntable 6 and the bottle 2 is created so that it follows the controlled rotating or swivelling movement of the turntable 6 around the turntable axis DA exactly and without slip, thus ensuring optimum processing or labelling of the bottles 2.

Particularly advantageous is that the force-locked or friction-locked connection is effected at the profiled centering surface and not at the bottom of the centering opening 13. This ensures, via the centering plate 9, an optimum centering and force-locked or friction-locked connection of the respective bottle 2 with the associated turntable 6. As shown in the positions a-d of FIG. 6, this applies to bottles 2*a*, 2*b*, 2*c* and 2*d* with very different sizes or with very different diameters in the area of the bottle bottom 2.1, with the bottles, according to the diameter in the area of their bottle bottom 2.1, more or less deeply reaching into the centering opening 13.

As mentioned above, the centering plates 9 are provided removably and thus interchangeably on the respective driving turntable 8. This also makes it possible, by changing over the container processing machine 1 to containers or bottles with clearly larger container diameter, to exchange the centering plates 9 for centering plates 9*a* (FIG. 7) which have a centering opening 13*a* with enlarged diameter but otherwise correspond with the centering plates 9.

The invention was described above using exemplary embodiments. Changes as well as variations are of course possible without departing from the idea underlying the invention.

Thus, in particular, it is also possible to implement the centering cone formed by the centering opening 13 or 13*a* for the friction-locked or force-locked connection with the bottles 2 differently, for example with a friction lining or gummed or with a roughness created for instance by etching and/or by the application or depositing of particles or otherwise, with these versions thus having the fundamental advantage that the centering surface or the centering cone simultaneously produces the force-locked or friction-locked connection between the respective container and the turntable.

Furthermore, it is also possible to implement the centering plates 9 or the tooth-like or rib-like projections 14 provided on these centering plates such that the centering plates 9 have a preferred direction of rotation. This extremely beneficial approach enables the implementation of the surfaces of the centering plates 9 with a very low friction coefficient such that the containers, when handed over by the infeed star to the container processing position, slip or slide into the centering plates 9 as smoothly as possible and take up a position there in which the central axis of the containers is congruent with the turntable axis DA.

The safe and slip-free driving of the containers by means of the centering plates 9 despite their—e.g.—very smooth surfaces is achieved by the tooth-like or rib-like projections 14 being, for example, sawtooth-shaped as shown in FIG. 8. For example, by this sawtooth-shaped design of the tooth-like or rib-like projections 14, they jam, dovetail or wedge when rotating in the preferred direction of rotation with the container which, for example, consists of a plastic material, completely or almost completely eliminating any slip between container and centering plates 9.

Furthermore, it is also possible to implement the tooth-like or rib-like projections 14 as a wedge shape such that these wedge-shaped projections 14 are inclined in the preferred direction of rotation so that the tips of the wedges, when rotating in the preferred direction, are directly supported against the bottom surfaces of the container wall or directly mesh with these and thus enable a slip-free turning of the containers.

Reference Symbol List

1 container processing machine
2 container or bottle
2.1 bottom of container or bottle
2.2 mouth area of container or bottle
3 rotor
4 machine frame
5 processing position
6 turntable
7 stamp
8 driving turntable
8.1 permanent magnet
9, 9*a* centering plate
10 projection
11 table edge element
12 recess
13 centering cone or centering opening
14 projection
15 indentation
16 turntable unit
17 drive
18 mounting flange
MA machine axis
DA turntable axis
α taper angle or cone angle

The invention claimed is:

1. An apparatus for use in container processing, said apparatus comprising a centering element, said centering element comprising a centering cone having a conical centering surface for receiving and centering a container at a container bottom thereof, wherein said centering cone, at said centering surface, is configured to make a force-locked and/or friction-locked connection with said container, wherein said centering surface comprises a profiled surface that is profiled by teeth that extend longitudinally in a direction parallel to a surface line of said centering surface, wherein said teeth define a preferred direction of rotation for said centering element.

2. The apparatus of claim 1, wherein said centering surface comprises a friction lining.

3. The apparatus of claim 2, wherein said friction lining is at least partially gummed.

4. The apparatus of claim 2, wherein said friction lining has rubber-like inserts.

5. The apparatus of claim 2, wherein said friction lining has a rubber-like coating.

6. The apparatus of claim 1, wherein said centering cone is formed by a centering opening in a plate-shaped or ring-shaped structure, and wherein said centering opening has a cross-section that becomes progressively narrower between a top of said centering element and a bottom of said centering element.

7. The apparatus of claim 6, wherein said centering cone defines a cone axis, and wherein an angle between said conical centering surface and said cone axis is between 50° and 60°.

8. The apparatus of claim 1, wherein said profiled surface is mechanically profiled.

9. The apparatus of claim 1, wherein said profiled surface is chemically profiled.

10. The apparatus of claim 1, wherein said profiled surface is profiled by application of particles.

11. The apparatus of claim 1, wherein said teeth have a wedge-shaped or sawtooth-shaped contour.

12. The apparatus of claim 1, further comprising a container holder for use with said centering element.

13. The apparatus of claim 12, wherein said container holder or turntable comprises a centering element holder, and wherein said centering element is provided removably and interchangeably on said centering element holder.

14. The apparatus of claim 13, wherein said centering element is held by at least one projection that engages a recess secured against rotation at said centering element holder.

15. The apparatus of claim 13, wherein said centering element is secured positively and/or by a force-lock at the centering element holder.

16. The apparatus of claim 12, wherein said centering element is provided removably and interchangeably on a driving turntable of said container holder.

17. The apparatus of claim 12, further comprising a container holder unit having a drive for controlled turning and/or swiveling of said container holder around a container holder axis.

18. The apparatus of claim 1, further comprising a rotatably drivable transport element coupled to several container holders.

19. The apparatus of claim 18, wherein said transport element comprises a rotor, said rotor being rotatable about a vertical machine axis.

20. The apparatus of claim 1, further comprising a turntable for use with said centering element.

* * * * *